United States Patent
Jakob et al.

(10) Patent No.: US 7,585,915 B2
(45) Date of Patent: Sep. 8, 2009

(54) WATER-RESISTANT ADHESIVES, THEIR PREPARATION AND USE

(75) Inventors: Martin Jakob, Kelkheim (DE); Werner Prass, Mainz (DE)

(73) Assignee: Celanese Emulsions GmbH, Kronberg/Ts. (DE)

( * ) Notice: Subject to any disclaimer, the term of this patent is extended or adjusted under 35 U.S.C. 154(b) by 752 days.

(21) Appl. No.: 10/899,164

(22) Filed: Jul. 26, 2004

(65) Prior Publication Data

US 2005/0032970 A1 Feb. 10, 2005

(30) Foreign Application Priority Data

Aug. 4, 2003 (DE) .................. 103 35 673

(51) Int. Cl.
*C08F 8/30* (2006.01)

(52) U.S. Cl. ............... 524/556; 524/563; 524/571; 525/374

(58) Field of Classification Search ........ 524/556, 524/563, 571; 525/374

See application file for complete search history.

(56) References Cited

U.S. PATENT DOCUMENTS

| | | | |
|---|---|---|---|
| 4,079,030 A | | 3/1978 | Takanen et al. |
| 4,118,357 A | | 10/1978 | Brabetz et al. |
| 4,442,257 A | | 4/1984 | Borovicka, Sr. et al. |
| 4,663,377 A | | 5/1987 | Hombach et al. |
| 4,728,680 A | | 3/1988 | Hahn, Jr. |
| 4,927,698 A | * | 5/1990 | Jaco et al. ............ 428/198 |
| 5,545,684 A | | 8/1996 | Jakob et al. |
| 5,667,848 A | * | 9/1997 | Wuestefeld et al. ...... 427/389.9 |
| 5,889,107 A | | 3/1999 | Jakob et al. |
| 5,907,011 A | * | 5/1999 | Jakob et al. ............. 524/524 |
| 6,001,132 A | * | 12/1999 | Bereck et al. ............ 8/116.1 |
| 6,265,589 B1 | | 7/2001 | Hois et al. |

FOREIGN PATENT DOCUMENTS

| | | |
|---|---|---|
| DE | 2 261 402 | 7/1974 |
| DE | 26 20 738 | 12/1977 |
| DE | 0 206 059 | 12/1986 |
| DE | 39 42 628 | 6/1991 |
| DE | 4240731 | 6/1994 |
| EP | 0143175 | 6/1985 |
| EP | 0 623 661 | 11/1994 |
| EP | 0 686 682 | 12/1995 |
| EP | 0 826 008 | 3/1998 |
| EP | 1 136 537 | 9/2001 |
| EP | 1 170 311 | 1/2002 |
| FR | 2288773 | 5/1976 |
| GB | 928326 | 6/1963 |
| GB | 1 204 818 | 9/1970 |
| GB | 1204818 A * | 9/1970 |
| WO | WO-98/29393 | 7/1998 |
| WO | WO-01/49788 | 7/2001 |
| WO | WO-03/059964 | 7/2003 |

OTHER PUBLICATIONS

Petersen, H., "Formaldehyde and new concepts for its application in textile finishing" Colourage, Jun. 16-30, 1987, p. 23-32.

\* cited by examiner

*Primary Examiner*—David Wu
*Assistant Examiner*—Michael M Bernshteyn
(74) *Attorney, Agent, or Firm*—Connolly Bove Lodge & Hutz LLP

(57) ABSTRACT

A description is given of an aqueous dispersion adhesive based on an aqueous polymer dispersion comprising at least one emulsion polymer with small amounts of crosslinkable N-methylol groups, at least one protective colloid, and at least one crosslinking agent containing N-methylol groups, of which at least one is etherified with an alkanol, said crosslinking agent being selected from the group consisting of hydroxymethylated cyclic ethyleneureas, hydroxymethylated cyclic propyleneureas, hydroxymethylated bicyclic glyoxal diureas, hydroxymethylated bicyclic malonaldehyde diureas or combinations thereof.

The aqueous dispersion adhesive can be employed in particular for adhesively bonding porous and semiporous substrates.

19 Claims, No Drawings

WATER-RESISTANT ADHESIVES, THEIR PREPARATION AND USE

DESCRIPTION

The present invention relates to aqueous dispersion adhesives based on a polymer dispersion and possessed of high wet bond strength, to the preparation of said dispersion adhesives, and to their use for bonding wood and other substrates, particularly porous or semiporous substrates.

Polymer dispersions, particularly those based on polyvinyl esters, such as polyvinyl acetate, are used extensively as white glues for the industrial gluing of wood and other porous or semiporous substrates. If the adhesive bond is likely to face water exposure following application, these products can also be made water-resistant, either by using specific crosslinkable or self-crosslinking comonomers during their preparation by emulsion polymerization and/or by subsequent addition of specific crosslinker additives, often in the form of crosslinker resins, in combination with crosslinking catalysts. The mode of action consists in the binding of the hydrophilic protective colloid, polyvinyl alcohol for example, that is frequently used for colloidal stabilization.

In this way specialty products are obtained which meet the requirements of relevant standards, such as of DIN EN 204, for example.

Cold-water-resistant adhesives, for kitchen furniture assembly, for example, are required to reach at least durability class D3 (wet bond strength $\geq 2$ N/mm$^2$ after test sequence D3/3 with 4-day cold-water storage). For outdoor applications or in window building for example, in the manufacture of window frames, use is made within the EU of boiling-water-resistant adhesives of durability class D4 (wet bond strength $\geq 4$ N/mm$^2$ after test sequence D4/5 with 6-hour storage in boiling water and two-hour storage in cold water).

In the do-it-yourself (DIY) sector as well, such as in the gluing of wood flooring, for example, dispersion-based water-resistant wood adhesives, in particular often already based on quality level D3, are now articles of everyday use. Because of the selling times, which in some circumstances are very prolonged owing to stockholding at builders' merchants and at the end user, there is a requirement here for the products to have a long shelf life, in the course of which the dispersions must not suffer any quality detractions and also must not show too great an increase in viscosity. The quality requirements imposed by customers further include not only compliance with but also significant exceedance of relevant test standards such as EN 204/D3, preferably by 50% to more than $\geq 3$ N/mm$^2$.

A further requirement, particularly in the central and northern European region, relates to low VOC contents (VOC=volatile organic compounds). The primary requirement here is for a low level of formaldehyde, which is introduced into the dispersions by way of the self-crosslinking comonomers or, in particular, by way of external crosslinker resins, as described in DE-B-22 61 402, for example.

An additional aspect is the fall in the price of base adhesives (i.e., dispersions supplied by the adhesive base material producers to the adhesives industry for end-use processing), which has been going on within the market for some years. This trend is forcing the producers of these intermediates toward intensified cost reduction through reducing quantities or costs of raw materials and/or through more reliable production methods.

Polymer dispersions based on polyvinyl esters, particularly polyvinyl acetate, which are prepared by aqueous emulsion polymerization of vinyl acetate in the presence of polymeric stabilizers (protective colloids), represent a mass product. Overviews of the preparation and application of polyvinyl acetate dispersions can be found in numerous references in the literature, such as, for example, in the Handbook of Adhesives (I. Skeist, ed.), 3$^{rd}$ edition, chapter 21. Also described therein is how, for example, the comonomer N-methylolacrylamide is widespread for the preparation of self-crosslinking vinyl acetate polymers. Owing to the favorable price of the raw material, the ready availability and the relatively good effects, this monomer is relied on continually at present in the low-cost segment of the cold-water-resistant D3 adhesives.

As would expected, the patent literature relating to self-crosslinking polymer dispersions, particularly polyvinyl ester dispersions containing methylol monomers, such as N-methylol(meth)acrylamide, is relatively extensive in the adhesives field.

Documents DE-C 26 20 738, DE-A-39 42 628, EP-B-826, 008 and EP-A-1,170,311, cited here by way of example, relate to adhesive systems which crosslink with acid catalysis and are based on copolymers of vinyl esters with crosslinkable comonomers, including N-methylolacrylamide. According to the disclosure in the working examples, these adhesives produce standards-compliant bonds of class EN 204/D3 (or, formerly, DIN 68602/B3) having bond strengths of >2 N/mm$^2$ in combination with water-soluble strong acids or their metal salts, particularly salts of Cr(III), Al(III), Fe(III) and Zr(IV).

The industrial use of these crosslinkable monomers often harbors serious problems as a result of their sensitivity on industrial handling: premature homopolymerization in the market-ready aqueous solution, for example. A painstaking temperature regime during the emulsion polymerization is necessary in order to avoid thermally induced premature crosslinking. The viscosity of the end products is likewise subject to relatively large fluctuations. Where relatively large amounts are used, moreover, there is a sharp drop in the storage stability of the end products formulated with acid. Furthermore, the N-methylol monomers also introduce a certain fraction of free formaldehyde into the dispersion, which remains as a technical impurity.

Proposals to substitute other systems for these comonomers, in whole or at least in part, are not found in the documents cited above.

Also known is the replacement of N-methylol monomers by their derivatives which are etherified with $C_1$-$C_6$ alkanols and are therefore less sensitive; with these N-alkoxymethyl (meth)acrylamides, the desired effects are not achieved, owing to their lower reactivities. Moreover, the higher prices of these products result in the adhesives being markedly more expensive.

Also known, as mentioned above, is the subsequent addition to the dispersions of various additives and external crosslinker resins, which endow the bonds produced from these adhesives with water resistance, or further enhance such resistance. These added substances can of course also be used in combination with the products described above containing N-methylol monomers.

In widespread use on the market as reactive additives or dispersion constituents are blocked polyisocyanates (as described in EP-A-206,059) or blocked polyfunctional aldehydes (as described in EP-B-686,682), both of which allow extremely high bond strengths up to the boiling-water-resistant durability class D4. As a result, the adhesives contain little or no formaldehyde, and no additional formaldehyde is introduced into the products; owing to the high reactivity, however, the achievable shelf lives for the adhesives are short, thereby rendering the products unsuitable for use as one-component systems in the DIY sector.

Improving the wet bond strengths of emulsion polymers already containing methylol monomers by adding resin is likewise prior art. By way of example mention may be made of EP-B-623,661, which proposes adding to such dispersions formaldehyde resins from the group of the resorcinol-formaldehyde resins, urea-formaldehyde resins, melamine-formaldehyde resins and phenol-formaldehyde resins. These systems carry the disadvantage alternatively of the high reactivity, which does not allow prolonged shelf lives, the introduction of free formaldehyde, or, in the case of formaldehyde-reduced specialty products from this group, the continued presence of residual formaldehyde concentration but in conjunction with reduced reactivity and a higher price.

Another group of resins used as additives in polyvinyl acetate-based dispersions is constituted by special N-hydroxymethyl-reactive resins, which can be used either alone or in combination with other resins. GB-A-1,204,818 cites polyalkoxyalkyl- and polyalkanoldiazines, -triazines and -tetrazines, imidazolidinones and thioimidazolidinones. Specific examples cited in the document are tetrabutoxymethyl-benzoguanamine and 1,3-dihydroxymethyl-4,5-dihydroxy-2-imidazolidinone. The last-mentioned compound is also known as dimethyloldihydroxyethyleneurea (DMDHEU) and is used as a textile finishing agent. References to the use thereof in dispersions containing free-radically copolymerized monomers that possess N-methylol groups are not given.

Types of crosslinker resin which are identical or structurally related to the abovementioned groups of resins are cited by WO-A-01/49788 (corresponding to EP-A-1,246,868) and include hydroxymethyl-substituted imidazolidinones, such as 1,3-dimethylol-4,5-dihydroxyimidazolidinone, (4,5-dihydroxy-N,N'-dimethylolethyleneurea), hydroxymethyl-substituted pyrimidinones or hydroxymethyl-substituted triazinones or their self-condensation products or mixed condensates of two or more of said compounds, or a mixture of two or more of said compounds. In one preferred embodiment, the polymer dispersion comprises a crosslinker resin based on 1,3-dimethyloldihydroxyimidazolidinone (4,5-dihydroxy-N,N'-dimethylolethyleneurea) in the form alternatively of the compounds per se, their self-condensation products or a mixture thereof. A disadvantage here again is that these compounds contain a considerable inherent fraction of formaldehyde, at up to 1.1% by weight. Moreover, these compounds have no fundamental advantage as compared with the use of copolymerizable methylol monomers for producing a D3 adhesive, and also possess a very high reactivity.

None of the abovementioned publications mentions what measures could be taken to achieve the desired reduction in the level of N-methylol groups in an adhesive formulation formulated for water resistance without suffering detractions from the customers' highly prized profile of the wet bond strength, in particular according to DIN EN 204/D3.

The object was therefore to provide a water-resistant adhesive which, as compared with the conventional adhesives containing polymer-bound polymer dispersions containing N-methylol groups achieves at least equal or improved wet bond strengths, preferably of durability class DIN EN 204/D3 while having a reduced fraction of copolymerizable N-methylol groups.

This object is achieved by means of the dispersion adhesive described below.

The present invention provides an aqueous dispersion adhesive based on a polymer dispersion, preferably having a pH of between 2 and 6, comprising at least one emulsion polymer containing crosslinkable N-methylol groups, derived through the incorporation of up to 2.0% by weight, preferably from 0.01% to 1.5% by weight, in particular from 0.05% to 0.8% by weight, based on the total monomer amount, of N-methylol-containing comonomers into the emulsion polymer, at least one protective colloid, and at least one crosslinking agent containing N-methylol groups fully or partly etherified with one or more alkanols and/or other hydroxyl groups fully or partly etherified with one or more alkanols, and selected from the group consisting of hydroxymethylated cyclic ethyleneureas, hydroxymethylated cyclic propyleneureas, hydroxymethylated bicyclic glyoxal diureas, hydroxymethylated bicyclic malonaldehyde diureas or combinations thereof.

A group of emulsion polymers as a basis for the dispersion adhesives of the invention is formed by the copolymers prepared by means of free-radical emulsion polymerization, constructed predominantly on the basis of vinyl esters as principal monomer basis, and comprising at least comonomers containing crosslinkable N-methylol groups.

Suitable principal vinyl ester monomers include preferably vinyl formate, vinyl acetate, vinyl propionate, vinyl isobutyrate, vinyl pivalate, vinyl 2-ethylhexanoate, vinyl esters of saturated branched monocarboxylic acids having 9 to 11 carbon atoms in the acid residue, vinyl esters of relatively long-chain saturated or unsaturated fatty acids, such as vinyl laurate or vinyl stearate, for example, and vinyl esters of benzoic acid and of substituted derivatives of benzoic acid, such as vinyl p-tert-butylbenzoate. Among these monomers, however, vinyl acetate is particularly preferred.

Said vinyl esters can be used individually in the polyvinyl ester or else can be present in a mixture in a copolymer alongside one another. The fraction of the vinyl esters from this group as a proportion of the total monomer amount in the copolymer is usually at least 50% by weight, preferably at least 75% by weight.

The emulsion polymer used in accordance with the invention contains crosslinkable N-methylol groups, which are introduced by copolymerization with comonomers containing N-methylol groups. Preferred examples of such comonomers are N-methylolacrylamide, N-methylolmethacrylamide, N-methylolallylcarbamate, N-methylolmaleimide, N-methylolmaleamic acid, and the N-methylol amides of aromatic vinyl carboxylic acids, such as N-methylol-p-vinylbenzamide, for example. Where the aqueous dispersion adhesives of the invention are used as water-resistant adhesives, the N-methylol amides of acrylic acid and methacrylic acid are particularly preferred. The fraction of these comonomers as a proportion of the total monomer amount is up to 2.0% by weight, preferably from 0.01% to 1.5% by weight, in particular from 0.05% to 1% by weight.

Further comonomers particularly suitable for preparing the emulsion polymers used in accordance with the invention are nitrogen-containing comonomers polymerizable with vinyl esters and containing N-functional groups, with the exception of the abovementioned monomers containing N-methylol groups. They include, in particular, N-ethanol(meth)acrylamide, N-propanol(meth)acrylamide, (meth)acrylamide, allylcarbamate, acrylonitrile, the N-methylol esters, N-alkyl ethers or Mannich bases of N-methylol(meth)acrylamide or N-methylolallylcarbamate, acrylamidoglycolic acid and/or its salts, methyl acrylamidomethoxyacetate, N-(2,2-dimethoxy-1-hydroxyethyl)acrylamide, N-dimethylaminopropyl-(meth)acrylamide, N-methyl(meth)acrylamide, N-butyl(meth)acrylamide, N-cyclohexyl(meth)acrylamide, N-dodecyl(meth)acrylamide, N-benzyl-(meth)acrylamide, p-hydroxyphenyl(meth)acrylamide, N-(3-hydroxy-2,2-dimethylpropyl)methacrylamide, ethyl imidazolidonemethacrylate, N-vinylformamide and N-vinylpyrrolidone. The fraction of these comonomers as a proportion of the total monomer amount is, if they are present, usually up to 15% by weight, preferably up to 10% by weight.

Further ethylenically unsaturated comonomers particularly suitable for preparing the emulsion polymers used in accordance with the invention and copolymerizable with the vinyl esters are α,β-unsaturated acids, examples being acrylic acid and methacrylic acid, and esters thereof with primary and secondary saturated monohydric alcohols having 1 to 32 carbon atoms, examples being methanol, ethanol, propanol, butanol, 2-ethylhexyl alcohol, cycloaliphatic or polycyclic alcohols and relatively long-chain fatty alcohols. It is also possible as well to use α,β-unsaturated dicarboxylic acids, examples being maleic acid, fumaric acid, itaconic acid and citraconic acid, and their monoesters or diesters with saturated monohydric aliphatic alcohols having 1 to 28 carbon atoms. The fraction of these comonomers as a proportion of the total monomer amount is, if they are present, usually up to 25% by weight, preferably up to 15% by weight.

Further comonomers particularly suitable for preparing the emulsion polymers used in accordance with the invention are ethylenically unsaturated hydrocarbons, such as ethylene or α-olefins having 3-28 carbon atoms, examples being propylene and/or butylene, or vinylaromatic hydrocarbons, such as styrene, vinyltoluene and/or vinylxylene, and halogenated unsaturated aliphatic hydrocarbons, examples being vinyl chloride, vinyl fluoride, vinylidene chloride and/or vinylidene fluoride. The fraction of these comonomers as a proportion of the total monomer amount is, if they are present, usually up to 50% by weight, preferably up to 25% by weight.

Further comonomers particularly suitable for preparing the emulsion polymers used in accordance with the invention are comonomers with polyethylenic unsaturation, and hence with a crosslinking action, examples being diallyl phthalate, diallyl maleate, triallyl cyanurate, tetraallyloxyethane, divinylbenzene, butane-1,4-diol dimethacrylate, triethylene glycol dimethacrylate, divinyl adipate, allyl (meth)acrylate, vinyl crotonate, methylenebisacrylamide, hexanediol diacrylate, pentaerythritol diacrylate and trimethylolpropane triacrylate or mixtures of two or more compounds from this group may be present in the polymer. The fraction of these comonomers as a proportion of the total monomer amount is, if they are present, usually up to 10% by weight, preferably up to 2% by weight.

Further comonomers particularly suitable for preparing the emulsion polymers used in accordance with the invention are hydroxy-functional esters of unsaturated carboxylic acids, such as hydroxyethyl (meth)acrylate, hydroxypropyl (meth)acrylate and adducts thereof with ethylene oxide or propylene oxide. The fraction of these comonomers as a proportion of the total monomer amount is, if they are present, usually up to 25% by weight, preferably up to 15% by weight.

Further comonomers particularly suitable for preparing the emulsion polymers used in accordance with the invention are comonomers which are self-crosslinking or crosslinkable by way of carbonyl groups, from the group consisting of diacetoneacrylamide, allyl acetoacetate, vinyl acetoacetate and acetoacetoxyethyl (meth)acrylate. The fraction of these comonomers as a proportion of the total monomer amount is, if they are present, usually up to 10% by weight, preferably up to 5% by weight.

A further group of suitable comonomers comprises monomers from the group of the unsaturated sulfonic acids and salts thereof, preferably vinylsulfonic acid, 2-acrylamido-2-methylpropanesulfonic acid, epoxy-functional comonomers, such as glycidyl methacrylate and glycidyl acrylate, and silicon-functional comonomers, such as acryloyloxypropyl-tri(alkoxy)silanes and methacryloyloxypropyltri(alkoxy)silanes, vinyltrialkoxysilanes and vinylmethyldialkoxysilanes, in which the alkoxy groups present may be, for example, ethoxy and ethoxypropylene glycol ether radicals, for example. The fraction of these comonomers as a proportion of the total monomer amount is, if they are present, usually up to 10% by weight, preferably up to 5% by weight.

The fraction of the comonomer units present in the copolymer in addition to the vinyl ester units can together amount to up to 50% by weight.

A further suitable group of emulsion polymers for the polymer dispersion which can be used as the polymer basis in the dispersion adhesives of the invention include copolymers prepared by means of free-radical emulsion polymerization and derived from vinylaromatics and 1,3-dienes, additionally modified with crosslinkable monomers containing N-methylol groups.

Suitable vinylaromatics are styrene, α-methylstyrene, vinyltoluene and/or vinylxylene. Preferably styrene is copolymerized. Examples of 1,3-dienes are 1,3-butadiene and isoprene. Preferably 1,3-butadiene is used in this context. The fraction of vinylaromatics and 1,3-dienes as a proportion of the total monomer amount is at least 50% by weight.

This emulsion polymer too contains crosslinkable N-methylol groups derived from comonomers such as N-methylolacrylamide, for example. Likewise suitable are the related N-methylol compounds listed above. The fraction of these comonomers as a proportion of the total monomer amount in this polymer as well is up to 2.0% by weight, preferably from 0.01% to 1.5% by weight, and in particular from 0.05% to 1% by weight.

These copolymers may likewise contain not only the vinylaromatics and 1,3-dienes but also further comonomer units from the aforementioned groups (with the exception of the vinylaromatics already mentioned), the total amount of the further comonomer units taken together being likewise up to 50% by weight.

The polymer dispersion comprises as stabilizer at least one protective colloid.

An example of a suitable protective colloid is polyvinyl alcohol, particularly polyvinyl alcohol with a degree of hydrolysis of 60-100 mol %, preferably from 70 to 98 mol %, and with viscosities, of the 4% strength by weight aqueous solutions at 20° C., of from 2 to 70 mPa*s. Also suitable are functional polyvinyl alcohols such as the formal copolymers of vinyl alcohol and, if desired, vinyl acetate with ethene, with vinyl acetoacetate or isopropenyl alcohol, or those containing carboxyl groups or alkoxysilane groups.

As protective colloids it is additionally possible to use etherified cellulose derivatives, examples being hydroxyethylcellulose, hydroxypropylcellulose and carboxymethylcellulose. These can be used either alone or in combination with polyvinyl alcohol. Likewise suitable are polyvinylpyrrolidone, polycarboxylic acids such as polyacrylic acid and also copolymers of maleic acid or of maleic anhydride with ethylenically unsaturated compounds such as methyl vinyl ether or styrene. Also suitable are polyalkylene glycols or the alkali metal salts of polyacrylic acids and polymethacrylic acids, starch derivatives and gelatin derivatives, 2-acrylamido-2-methylpropanesulfonic acid and/or 4-styrenesulfonic acid copolymers and their alkali metal salts, but also homopolymers and copolymers of N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylates, methacrylates, acrylamides and/or methacrylamides.

A detailed description of further suitable protective colloids can be found in Houben-Weyl, Methoden der organischen Chemie, volume XIV/1, Makromolekulare Stoffe [Macromolecular Compounds], Georg-Thieme-Verlag, Stuttgart, 1961, pages 411 to 420. Preference is given to the predominant use of polyvinyl alcohol. Based on the total amount of the monomers, the fraction of the protective colloids is preferably from 1% to 20% by weight, in particular from 2% to 14% by weight.

In addition to the protective colloids it is possible to use nonionic and/or ionic emulsifiers in the inventively employed polymer dispersion as additional stabilizers. These additional stabilizers, if present, are present typically in amounts of up to 2% by weight, based on the total amount of the monomers. Compounds suitable for this purpose can be found in relevant compilations known to the skilled worker, such as the Surfactant Applications Directory (D. R. Karsa et al., Ed., Blackie, London 1991) or in Houben-Weyl, Methoden der organischen Chemie, volume XIV/1, Makromolekulare Stoffe [Macromolecular Compounds], Georg-Thieme-Verlag, Stuttgart, 1961, pages 190 to 208.

The aqueous dispersion adhesive of the invention comprises at least one crosslinking agent containing N-methylol groups fully or partly etherified with one or more alkanols and/or other hydroxyl groups fully or partly etherified with one or more alkanols and selected from the group consisting of hydroxymethylated cyclic ethyleneureas, hydroxymethylated cyclic propyleneureas, hydroxymethylated bicyclic glyoxal diureas, hydroxymethylated bicyclic malonaldehyde diureas or combinations thereof.

The alkanols used for the etherification are monohydric or polyhydric alcohols containing primary, secondary and/or tertiary alcohol groups. They are preferably monohydric or dihydric alcohols containing secondary and/or in particular primary alcohol groups.

Preference is given to using crosslinking agents fully or partly etherified with $C_1$ to $C_{40}$ alkanols, which can if desired contain one or more oxygen atoms in the chain, in particular with different $C_1$ to $C_{40}$ alkanols which can if desired contain one or more oxygen atoms in the chain.

Preferred at least partly etherified derivatives used in accordance with the invention are compounds from groups Ia to Id below, in which at least one ring OH group or methylol group as elucidated below has been etherified.

Particularly suitable are cyclic ethyleneureas of the general formula Ia

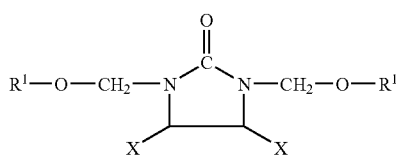

in which the radicals X are different or, preferably, identical and are hydrogen, hydroxyl groups or $C_1$-$C_4$ alkoxy groups, methoxy or ethoxy for example, and/or cyclic propyleneureas of the general formula Ib

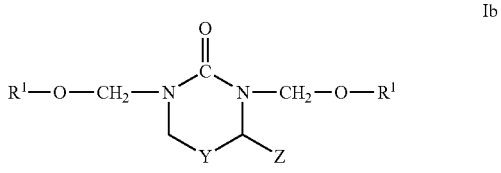

in which Y is $CH_2$, CHOH, $C(CH_3)_2$, an oxygen atom or a nitrogen atom that carries a $C_1$-$C_4$ alkyl group and Z is hydrogen or a $C_1$-$C_4$ alkoxy group, methoxy or ethoxy for example, and/or bicyclic glyoxal diureas of the general formula Ic

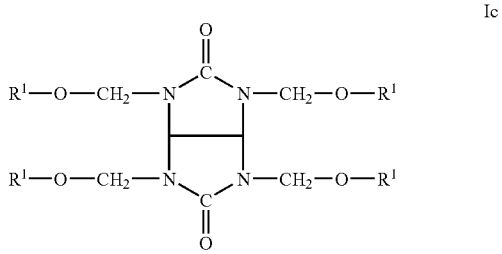

and/or bicyclic malonaldehyde diureas of the general formula Id

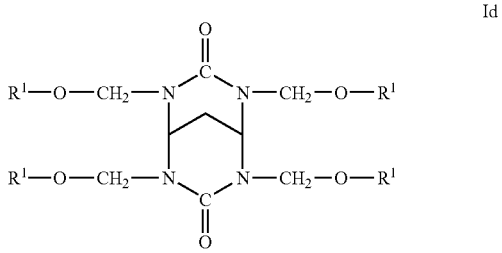

in which in all of formulae Ia to Id the radical $R^1$ can be identical or different and is either hydrogen or a $C_1$-$C_{10}$ alkyl group which is uninterrupted or interrupted by nonadjacent oxygen atoms and is unsubstituted or substituted by one or more hydroxyl groups, such as —$CH_2CH_2OCH_3$, —$CH_2CH_2OCH_2CH_3$ or —$CH_2CH_2OCH_2CH_2OCH_3$.

Further examples of $R^1$ include the following: n-butyl, isobutyl, sec-butyl, tert-butyl, n-pentyl, n-hexyl, 2-ethylhexyl and 2-methoxyethyl; of particular interest are the $C_1$-$C_3$ alkyl groups ethyl, n-propyl, isopropyl and, in particular, methyl. Also of interest are those alkyl groups and oxygen-interrupted alkyl groups which carry one, two, three or more hydroxyl groups.

Of particular suitability as additives for the dispersion adhesive of the invention are the at least partly etherified derivatives of 1,3-dimethylol4,5-dihydroxyethyleneurea (DMDHEU) in which both nitrogen atoms of the imidazolidinone ring are substituted (etherified) symmetrically or, in particular, asymmetrically.

With preference one of the two methylol groups of the DMDHEU is etherified with a methyl radical while the other methylol group is derivatized by reaction with a polyol selected from the group consisting of ethylene glycol, diethylene glycol, 1,2- and 1,3-propylene glycol, 1,2-, 1,3- and 1,4-butylene glycol, glycerol and polyethylene glycols of the formula $HO(CH_2CH_2O)_nH$ where $3<=n<=20$, preferably diethylene glycol. Asymmetrically substituted DMDHEUs of this kind are described for example in WO-A-98/29,393.

The crosslinking agents are used normally at from 0.001% to 4% by weight, preferably from 0.01% to 2% by weight, based on the solids content of the emulsion polymer.

Suitable compounds from this group are available commercially, for example, under the brand name ®Arkofix from Clariant GmbH. Among these, ®Arkofix NEC plus conc. represents a particularly suitable product.

The dispersion adhesive of the invention comprises crosslinking catalysts as well as the polymer dispersion and the crosslinking agent. These catalysts may be free acids or, preferably, acidic metal salts. Salts suitable for this purpose are those with polyvalent complexable cations, as set out for example in. DE-B-22 61 402, DE-C-26 20 738 and DE-A-39 42 628.

Preference is given to using the water-soluble metal salts of Al(II) or Zr(IV), especially aluminum chloride, aluminum nitrate, zirconium oxychloride and/or zirconium nitrate.

The amount of these crosslinking catalysts is typically from 0.05% to 10% by weight, preferably from 0.1% to 8% by weight, based on the amount of the dispersion adhesive.

In order to improve the water resistance it is additionally possible to use further salts or additives, such as magnesium chloride, organic and/or inorganic acids, such as citric acid, glycolic acid, or acidic inorganic salts, sodium tetrafluoroborate for example.

The amount of these further salts or additives is typically from 0.05% to 10% by weight, preferably from 0.1% to 5% by weight, based on the amount of the dispersion adhesive.

The pH range which is optimum for crosslinking is preferably between 2 and 6, in particular between 2.5 and 4. A suitable pH may be obtained immediately after emulsion polymerization or, as preferred, may be brought about subsequently by addition of the abovementioned acidic compounds.

The aqueous polymer dispersion may comprise further customary additives, examples being film-forming auxiliaries for lowering the minimum film formation temperature (MFFT), plasticizers, defoamers, fillers and preservatives.

The solids content of the aqueous dispersion adhesive of the invention is preferably from 20% to 65% by weight, in particular from 30% to 63% by weight.

One preferred embodiment of the aqueous dispersion adhesive of the invention comprises
 a) a copolymer based on one or more poly(vinyl esters), preferably based on poly(vinyl acetate), the poly(vinyl ester) additionally containing 0.01%-1.5% by weight, preferably 0.01%-1%, based on the total amount of all monomers, of one or more crosslinkable comonomer units containing N-methylol groups, preferably derived from N-methylol(meth)acrylamide,
 b) 1%-20% by weight, based on the total amount of all monomers, of at least one protective colloid, preferably poly(vinyl alcohol),
 c) from 0.001% to 1% by weight, based on the amount of the polymer dispersion, of at least one derivative partly etherified at least with one or more alkanols and from the group of hydroxymethylated cyclic ethyleneureas, hydroxymethylated cyclic propyleneureas, hydroxymethylated bicyclic glyoxal diureas or hydroxymethylated bicyclic malonaldehyde diureas, and
 d) at least one acidic metal salt and/or an acid in sufficient amount to establish a pH of 2-6, preferably from 2.5 to 4.

Another preferred embodiment of the aqueous dispersion adhesive of the invention comprises
 e) a copolymer based on one or more polyvinyl esters, preferably based on polyvinyl acetate, additionally containing 0.01%-1.5% by weight, preferably 0.01%-1%, based on the total amount of all monomers, of one or more comonomer units containing crosslinkable N-methylol groups, preferably derived from N-methylol (meth)acrylamide, and also 0.01%-3.0% by weight, based on the total amount of all monomers, of one or more further functional comonomer units derived from etherified N-methylol monomers, unsaturated carboxylic acids and/or OH-functional esters of unsaturated carboxylic acids,
 f) 1%-20% by weight, based on the total amount of all monomers, of at least one protective colloid, preferably polyvinyl alcohol,
 g) from 0.001% to 1% by weight, based on the amount of the aqueous dispersion adhesive, of at least one at least partly etherified derivative from the group of hydroxymethylated cyclic ethyleneureas, hydroxymethylated cyclic propyleneureas, hydroxymethylated bicyclic glyoxal diureas or hydroxymethylated bicyclic malonaldehyde diureas, and
 h) at least one acidic metal salt and/or an acid in sufficient amount to establish a pH of 2-6, preferably from 2.5 to 4.

A further preferred embodiment of the aqueous dispersion adhesive of the invention contains from from 0.001% to 1% by weight, based on the amount of the aqueous dispersion adhesive, of at least one at least partly etherified, preferably asymmetricaly partly etherified, derivative from the group of hydroxymethylated cyclic ethyleneureas, hydroxymethylated cyclic propyleneureas, hydroxymethylated bicyclic glyoxal diureas or hydroxymethylated bicyclic malonaldehyde diureas.

The present invention also provides a process for preparing the aqueous dispersion adhesive of the invention.

The aqueous polymer dispersion is prepared conventionally by the emulsion polymerization process, the polymerization temperature being generally from 40° C. to 100° C., preferably from 60° C. to 90° C., in particular 62° C.-85° C.

The polymerization is initiated using initiators or redox initiator combinations customary for emulsion polymerization, examples being hydroperoxides, such as tert-butyl hydroperoxide, azo compounds, such as azobisisobutyrdnitrile, and inorganic initiators, such as the sodium, potassium and ammonium salts of peroxodisulfuric acid. These initiators are used generally in an amount of from 0.05% to 3.5% by weight, based on the total weight of the monomers.

As redox initiators use is made if desired of combinations of the aforementioned initiators in combination with reducing agents such as sodium sulfite, sodium hydroxymethanesulfinate or ascorbic acid. The amount of reducing agent is preferably from 0.01% to 5.0% by weight, based on the total weight of the monomers.

The polymerization batch is stabilized predominantly by means of the aforementioned protective colloids, with the additional use where appropriate of emulsifiers, but preferably without their use.

The protective colloid fraction and, where used, emulsifier fraction is preferably included partly in the initial charge. It is, however, also possible to add the protective colloids and, where used, emulsifiers before, during or after the polymerization.

The monomers can all be included in the initial charge, all metered in, or included in fractions in the initial charge, with the remainder being metered in after the polymerization has been initiated.

After the end of the polymerization it is possible to carry out postpolymerization, employing known methods, in order to remove residual monomer, an example being postpolymerization initiated by redox catalyst. Volatile residual monomers can also be removed by means of distillation, preferably under reduced pressure, and, if desired, by passing inert entraining gases such as air, nitrogen or steam through or over the product.

After the end of polymerization and, where practiced, demonomerization, this dispersion is then admixed if desired with at least one acidic metal salt and/or an acid in sufficient amount to establish the appropriate pH and with at least one derivative partly or fully etherified with alkanols, from the group of hydroxymethylated cyclic ethyleneureas, hydroxymethylated cyclic propyleneureas, hydroxymethylated bicyclic glyoxal diureas or hydroxymethylated bicyclic malonaldehyde diureas.

In the course of end-use processing, further additives may be added to the polymer dispersion, examples being film-forming auxiliaries for MFT reduction, plasticizers, defoamers, fillers and preservatives. Any desired combinations with regard to the sequence of the additions are permissible within the scope of this invention.

The invention accordingly provides a process for preparing the above-described aqueous dispersion adhesives which comprises the steps of
i) carrying out aqueous emulsion polymerization of free-radically polymerizable monomers at least one of which contains crosslinkable N-methylol groups and is in an amount of up to 2.0% by weight, based on the total monomer amount, in the presence of a protective colloid and in conventional manner, and
ii) adding at least one crosslinking agent containing N-methylol groups esterified fully or partly with one or more alkanols and/or other hydroxyl groups esterified fully or partly with one or more alkanols and selected from the group consisting of hydroxymethylated cyclic ethyleneureas, hydroxymethylated cyclic propyleneureas, hydroxymethylated bicyclic glyoxal diureas, hydroxymethylated bicyclic malonaldehyde diureas or combinations thereof following the preparation of the aqueous emulsion polymer.

The aqueous dispersion adhesives of the invention possess a reduced amount of copolymerized N-methylol compounds and can therefore be prepared industrially with lower handling costs. They nevertheless have comparable or improved cold-water resistance in conjunction with a comparable or reduced formaldehyde fraction, the comparison being in each case with the conventional adhesives. Consequently they achieve at least durability class D3 in accordance with test standard DIN EN 204, and often significantly exceed the minimum requirement of 2 N/mm$^2$, preferably by at least 50%.

The dispersion adhesives of the invention can be processed in conventional manner by applying them to at least one surface of the substrates to be bonded and joining said substrates.

The invention further provides for the use of the dispersion adhesive of the invention for adhesively bonding substrates, preferably porous and semiporous substrates.

The specific suitability of the dispersion adhesive of the invention lies in its use as a cold-water-resistant adhesive, particularly for cellulosic substrates such as wood.

The adhesives are suitable for the do-it-yourself sector or as industrial adhesives for machine gluing and also in particular for applications in which the bonds are cured by means of high-frequency alternating currents.

They are especially suitable in applications requiring the use of cold-water-resistant adhesives having a relatively high profile of features.

Further general application examples are the production of water-resistant adhesive bonds of paper, cardboard, including corrugated cardboard, foam, cement, leather, textile or compressed laminates.

Other applications include their use as adhesives for the construction sector, as flooring, wall or ceiling adhesive or as furniture foil adhesives or carpet-backing adhesives.

Further areas of suitability exist in their use as water-resistant binders for wood fiberboard or reconstituted leather and also binders for insulating materials comprising paper or polymer fibers, and additionally in water-resistant construction dispersions as binders for plaster or cement.

A further field of use is that as binders for textile sheet materials and nonwovens and also in textile printing and as a textile finish.

EXAMPLES

The examples which follow serve to illustrate the invention. The parts and percentages indicated in the examples are by weight unless noted otherwise.

Preparation of polymer dispersions for inventive examples 1-8 and comparative examples C1-C4.

The experimental apparatus consists of a cylindrical 3 l glass reactor with anchor stirrer (130 rpm), which was equipped with metering vessels, reflux condenser, jacket heating and cooling, and a temperature measurement and control unit. First of all a polymerization mixture was prepared from 93 parts (or 94.5 parts in the case of dispersions A and C) of deionized water, 7.2 parts of a partially hydrolyzed polyvinyl alcohol with a degree of hydrolysis of 88 mol % and a Höppler viscosity as a 4% strength aqueous solution (at 20° C.) of 18 mPa*s, 1.8 parts of a partially hydrolyzed polyvinyl alcohol having a degree of hydrolysis of 88 mol % and a Höppler viscosity as a 4% strength aqueous solution (at 20° C.) of 40 mPa*s and 0.05 part of anhydrous sodium acetate. Before the start of the reaction, 0.12 part of defoamer ®Agitan 301 (Münzing-Chemie) and 0.035 part of sodium bicarbonate were added to this mixture. The internal temperature was raised to 65° C. and the polymerization was initiated with the addition of 7.2 parts of vinyl acetate and 0.02 part of ammonium peroxodisulfate in 0.15 part of water.

Following the onset of the reaction, three feed streams were started. The first feed stream consisted of the remainder of the total amount of vinyl acetate indicated in Table 1 and further included where appropriate (in the case of dispersions C, D and G) the amount of isobutoxymethylacrylamide (IBMA) likewise indicated in Table 1. The second feed stream consisted of an aqueous solution of N-methylolacrylamide (NMA). This solution was prepared from a commercial solution of the monomer, which had a concentration of 48%, by dilution with deionized water (see data of Table 1). The third feed stream consisted of a solution of 0.03 part of ammonium peroxodisulfate in 8 parts of deionized water. The feed streams were metered in simultaneously in parallel over 3.5 hours. The polymerization temperature was 80+/−2° C. Postpolymerization was carried out subsequently at 80° C., with the further addition of 0.01 part of ammonium peroxodisulfate in 0.03 part of water, and, at 50° C., with additions of aqueous solutions of 0.05 part each of tert-butyl hydroperoxide and sodium pyrosulfite each in 0.15 part of water. The solids contents of the dispersions were 50.2%+/−0.2% and the residual vinyl acetate contents were below 3000 ppm.

The test specimens were produced in accordance with the procedure of DIN EN 205. Gluing and testing were carried out subject to the following key data:

TABLE 1

| | Dispersion | | | | | | | | | |
|---|---|---|---|---|---|---|---|---|---|---|
| | A | B | C | D | E | F | G | H | I | J |
| Parts of vinyl acetate | 99.90 | 99.25 | 98.90 | 98.75 | 99.50 | 99.75 | 99.25 | 99.00 | 98.00 | 98.50 |
| Parts of NMA | 0.1 | 0.75 | 0.1 | 0.25 | 0.5 | 0.25 | 0.25 | 1.00 | 2 | 1.5 |
| Parts of water for NMA feed stream | 4.5 | 6 | 4.5 | 6 | 6 | 6 | 6 | 6 | 6 | 6 |
| Parts of IBMA | 0 | 0 | 1 | 1 | 0 | 0 | 0.5 | 0 | 0 | 0 |

Inventive Examples 1 to 8 and Comparative Examples C1 to C4

100 parts of the polymer dispersion were initially admixed with 2 parts of butyl diglycol acetate (as film former) and with 3 parts of a 54% strength solution of aluminum chloride hexahydrate as acidic crosslinking catalyst. The pH of the dispersions was 2.8±0.1.

Subsequently the formulated dispersion was admixed in the inventive examples 1-8 with the amounts indicated in Table 2 of ®Arkofix NEC PLUS conc. and in comparative example C4 with similar amounts of ®Arkofix NG conc. (both products of Clariant GmbH). The percentages are based on the dispersion already containing film former and acidic metal salt. ®Arkofix NEC PLUS conc. is an asymmetric mixed ether of methanol and diethylene glycol, based on N,N'-dimethyloldihydroxyethyleneurea (DMDHEU). The crosslinker ®Arkofix NG conc., co-tested for purposes of comparison, on the other hand, is nonetherified DMDHEU.

The wet bond strengths of the adhesives on beech wood test specimens after 4-day cold-water treatment were determined in accordance with test standard DIN EN 204/D3.

| | |
|---|---|
| Glue application: | 150 ± 20 g/m²; application to both sides |
| Open waiting time: | 3 minutes |
| Closed waiting time: | 3 minutes |
| Pressing time: | 2 hours |
| Pressing pressure: | 0.7 ± 0.1 N/mm² |
| Number of test specimens per test sequence | 10 |
| Tester after | 7 days standard conditions*) |
| Storage sequence according to DIN EN 204 D3/3: | 4 days in cold water (20 +/− 5° C.) |
| Test temperature: | 23° C. ± 2° C. |
| Rate of advance: | 50 mm/min. |

*)23 ± 2° C. and 50 ± 5% relative humidity
(Classification into durability class D3/3 is made for a tensile strength of >= 2 N/mm²)

The results obtained are set out in Table 2. The table also contains information on the viscosity of the dispersions (Brookfield viscometer at 23° C. testing temperature, measurement system RVT, spindle 6 (in the range up to 50 Pa*s) or spindle 7 (range from 50 to 200 Pa*s) and also the viscosity after 10 days of storage at 50° C.

TABLE 2

| Example | Prepared from dispersion | Co-monomer 1 | Co-monomer 2 | Parts of crosslinker resin | Viscosity Pa * s | Viscosity Pa * s after 10 d 50° C. | D3/3 N/mm² |
|---|---|---|---|---|---|---|---|
| 1 | A | 0.1% NMA | — | 0.50 Arkofix NEC | 20.05 | 62.40 | 3.5 |
| 2 | B | 0.75% NMA | — | 0.25 Arkofix NEC | 18.55 | 72.80 | 4.0 |
| 3 | C | 0.1% NMA | 1% IBMA | 0.25 Arkofix NEC | 24.10 | 49.80 | 3.7 |
| 4 | D | 0.25% NMA | 1% IBMA | 0.25 Arkofix NEC | 21.75 | 101.60 | 3.5 |
| 5 | E | 0.5% NMA | — | 0.25 Arkofix NEC | 20.45 | 50.80 | 3.5 |
| 6 | F | 0.25% NMA | — | 0.25 Arkofix NEC | 20.15 | 54.00 | 3.3 |
| 7 | G | 0.25% NMA | 0.5% IBMA | 0.25 Arkofix NEC | 20.35 | 66.40 | 3.2 |
| 8 | H | 1% NMA | — | 0.25 Arkofix NEC | 21.00 | 103.40 | 3.5 |
| C1 | I | 2% NMA | — | — | 33.90 | 1) | 4.0 |
| C2 | J | 1.5% NMA | — | — | 28.20 | 1) | 4.0 |

TABLE 2-continued

| Example | Prepared from dispersion | Co-monomer 1 | Co-monomer 2 | Parts of crosslinker resin | Viscosity Pa * s | Viscosity Pa * s after 10 d 50° C. | D3/3 N/mm² |
|---|---|---|---|---|---|---|---|
| C3 | B | 0.75% NMA | — | — | 29.35 | 70.20 | 2.9 |
| C4 | H | 1% NMA | — | 0.25 Arkofix NG | 23.45 | 1) | 6.2 |

1) Measurement impossible owing to completely crosslinked sample.

With the inventive examples it was possible to obtain products which exceeded by at least 50% the minimum wet bond strength standard of 2 N/mm². This is achieved advantageously with a simultaneously reduced fraction of copolymerized N-methylol monomers as compared with comparative examples C1, C2 and C4. A direct comparison of comparative example C3, which contained 0.75% NMA and was below the required limit, at 2.9 N/mm², with example 2 shows that for a given amount of NMA the addition of Arkofix NEC PLUS conc. resulted in a significantly improved wet bond strength.

Comparative example C4, in which nonetherified DMD-HEU was used, did give correspondingly high bond strengths, on account of the high reactivity; however, in comparison to example 8, which contained the same fraction of copolymerizable N-methylol monomers, it did not result in a storage-stable product.

What is claimed is:

1. An aqueous dispersion adhesive based on a polymer dispersion comprising at least one emulsion polymer containing crosslinkable N-methylol groups, derived through the incorporation of up to 2.0% by weight, based on the total monomer amount, of N-methylol-containing comonomers into the emulsion polymer, at least one protective colloid, and at least one crosslinking agent containing N-methylol groups fully or partly etherified with one or more alkanols and/or other hydroxyl groups fully or partly etherified with one or more alkanols, selected from the group consisting of hydroxymethylated cyclic ethyleneureas, hydroxymethylated cyclic propyleneureas, hydroxymethylated bicyclic glyoxal diureas, hydroxymethylated bicyclic malonaldehyde diureas, and combinations thereof.

2. The aqueous dispersion adhesive as claimed in claim 1, wherein the emulsion polymer contains crosslinkable N-methylol groups derived through the incorporation of from 0.01% to 1.5% by weight, based on the total monomer amount, of N-methylol-containing comonomers.

3. The aqueous dispersion adhesive as claimed in claim 2, wherein an emulsion polymer is used that contains crosslinkable N-methylol groups derived through the incorporation of from 0.05% to 0.8% by weight, based on the total monomer amount, of N-methylol-containing comonomers.

4. The aqueous dispersion adhesive as claimed in claim 1, wherein an emulsion polymer is used which is constructed of at least 50% by weight of vinyl esters as principal monomer and further comprises at least 2.0% by weight, based on the total monomer amount, from comonomers containing crosslinkable N-methylol groups.

5. The aqueous dispersion adhesive as claimed in claim 4, wherein the vinyl esters are selected from the group consisting of vinyl formate, vinyl acetate, vinyl propionate, vinyl isobutyrate, vinyl pivalate, vinyl 2-ethylhexanoate, vinyl esters of saturated branched monocarboxylic acids having 9 to 11 carbon atoms in the acid residue, vinyl esters of saturated fatty acids, vinyl esters of unsaturated fatty acids, vinyl esters of benzoic acid, and vinyl esters of substituted derivatives of benzoic acid.

6. The aqueous dispersion adhesive as claimed in claim 1, wherein the comonomers containing N-methylol groups are selected from the group consisting of N-methylolacrylamide, N-methylolmethacrylamide, N-methylolallylcarbamate, N-methylolmaleamide, N-methylolmaleamic acid, and the N-methylol amides of aromatic vinyl carboxylic acids, and wherein the fraction of these comonomers as a proportion of the total monomer amount is from 0.01% to 1.5% by weight.

7. The aqueous dispersion adhesive as claimed in claim 4, wherein said emulsion polymer is derived from at least one further comonomer selected from the group consisting of nitrogen-containing comonomers polymerizable with vinyl esters and containing N-functional groups; α,β-unsaturated monocarboxylic acids; esters of α,β-unsaturated monocarboxylic acids with primary and secondary saturated monohydric alcohols having 1 to 32 carbon atoms; esters of α,β-unsaturated monocarboxylic acids with cycloaliphatic alcohols; esters of α,β-unsaturated monocarboxylic acids with polycyclic alcohols; esters of α,β-unsaturated monocarboxylic acids with long-chain fatty alcohols; α,β-unsaturated dicarboxylic acids; monoesters and diesters of α,β-unsaturated dicarboxylic acids with saturated monohydric aliphatic alcohols having 1 to 28 carbon atoms; ethylenically unsaturated hydrocarbons; vinylaromatic hydrocarbons; 1,3-dienes; halogenated unsaturated aliphatic hydrocarbons; polyethylenically unsaturated comonomers; hydroxy-functional esters of unsaturated carboxylic acids; comonomers which are self-crosslinking, comonomers which are crosslinkable by way of carbonyl groups; diacetoneacrylamide; allyl acetoacetate; vinyl acetoacetate; acetoacetoxyethyl (meth)acrylate, unsaturated sulfonic acids and salts thereof; epoxy-functional comonomers; and silicon-functional comonomers.

8. The aqueous dispersion adhesive as claimed in claim 1, wherein the emulsion polymer is a copolymer derived from vinylaromatics and 1,3-dienes and additionally modified with monomers containing crosslinkable N-methylol groups.

9. The aqueous dispersion adhesive as claimed in claim 7, wherein said vinylaromatic hydrocarbons are selected from the group consisting of styrene, α-methylstyrene, vinyltoluene, vinylxylene, and mixtures thereof, and wherein said 1,3-dienes are selected from the group consisting of 1,3-butadiene, isoprene, and mixtures thereof.

10. The aqueous dispersion adhesive as claimed in claim 1, wherein the protective colloid is selected from the group consisting of polyvinyl alcohol; copolymers of vinyl alcohol with ethene; copolymers of vinyl alcohol with vinyl acetoacetate; copolymers of vinyl alcohol with isopropenyl alcohol; copolymers of vinyl alcohol with monomers containing carboxyl groups; copolymers of vinyl alcohol with monomers containing alkoxysilane groups; copolymers of vinyl alcohol and vinyl acetate with ethene; copolymers of vinyl alcohol and vinyl acetate with vinyl acetoacetate; copolymers of vinyl alcohol and vinyl acetate with isopropenyl alcohol; copolymers of vinyl alcohol and vinyl acetate with monomers containing carboxyl groups; copolymers of vinyl alcohol and vinyl acetate with monomers containing alkoxysilane groups; etherified cellulose derivatives; polyvinylpyrrolidone; polycarboxylic acids; copolymers of maleic acid with ethylenically unsaturated compounds; copolymers of maleic anhydride with ethylenically unsaturated compounds; polyalkylene glycols, alkali metal salts of polyacrylic acids; alkali metal salts of polymethacrylic acids; starch derivatives; gelatin derivatives; 2-acrylamido-2-methylpropanesulfonic acid copolymers; alkali metal salts of 2-acrylamido-2-methylpropanesulfonic acid copolymers; 4-styrenesulfonic acid copolymers; alkali metal salts of 4-styrenesulfonic acid copolymers; 2-acrylamido-2-methylpropanesulfonic acid and 4-styrenesulfonic acid copolymers; alkali metal salts of 2-acrylamido-2-methylpropanesulfonic acid and 4-styrenesulfonic acid copolymers; N-vinylpyrrolidone homopolymers; N-vinylcaprolactam homopolymers; N-vinylcarbazole homopolymers; 1-vinylimidazole homopolymers; 2-vinylimidazole homopolymers; 2-vinylpyridine homopolymers; 4-vinylpyridine homopolymers; acrylamide homopolymers; methacrylamide homopolymers; amino-bearing acrylate homopolymers; methacrylate homopolymers; acrylamide homopolymers; methacrylamide homopolymers; N-vinylpyrrolidone copolymers; N-vinylcaprolactam copolymers; N-vinylcarbazole copolymers; 1-vinylimidazole copolymers; 2-vinylimidazole copolymers; 2-vinylpyridine copolymers; 4-vinylpyridine copolymers; acrylamide copolymers; methacrylamide copolymers; amino-bearing acrylate copolymers; methacrylate copolymers; acrylamide copolymers; and methacrylamide copolymers.

11. The aqueous dispersion adhesive as claimed in claim 10, wherein the protective colloid is polyvinyl alcohol.

12. The aqueous dispersion adhesive as claimed in claim 1, wherein the crosslinking agent is selected from the group of compounds of the cyclic ethyleneureas of the general formula Ia

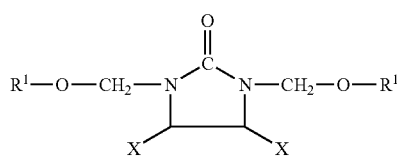

wherein X maybe identical or different and X, is selected from the group consisting of hydrogen, hydroxyl groups or $C_1$-$C_4$ alkoxy groups;

the cyclic propyleneureas of the general formula Ib

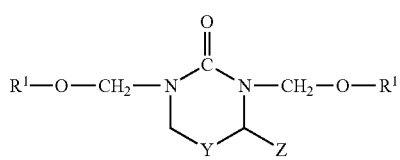

wherein Y is selected from the group consisting of $CH_2$, CHOH, $C(CH_3)_2$, an oxygen atom or a nitrogen atom that carries a $C_1$-$C_4$ alkyl group and Z is hydrogen or a $C_1$-$C_4$ alkoxy group; the bicyclic glyoxal diureas of the general formula Ic

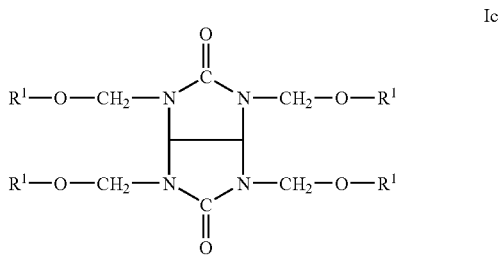

the bicyclic malonaldehyde diureas of the general formula Id

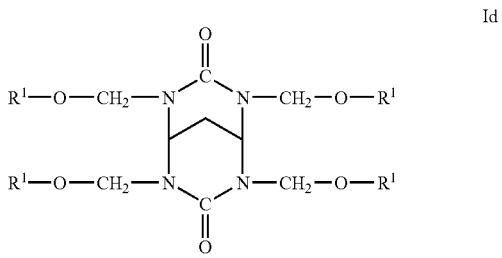

or a mixture thereof; and wherein $R^1$ can be identical or different in all of formula Ia to Id and $R^1$ is either hydrogen or a $C_1$-$C_{10}$ alkyl group which is uninterrupted or interrupted by nonadjacent oxygen atoms and is unsubstituted or substituted by one or more hydroxyl groups.

13. The aqueous dispersion adhesive as claimed in claim 12, wherein the crosslinking agent is a cyclic ethyleneurea of the general formula Ia which is an at least partly etherified derivative of 1,3-dimethylol-4,5-dihydroxyethyleneurea in which both nitrogen atoms of the imidazolidinone ring are etherified.

14. The aqueous dispersion adhesive as claimed in claim 13, wherein one of the two methylol groups of the 1,3-dimethylol-4,5-dihydroxyethyleneurea is etherified with a methyl radical and wherein the other methylol group is etherified by reaction with a polyol selected from the group consisting of ethylene glycol, diethylene glycol, 1,2- and 1,3-propylene glycol, 1,2-, 1,3- and 1,4-butylene glycol, glycerol and polyethylene glycols of the formula $HO(CH_2CH_2O)_nH$ in which n is an integer between 3 and 20.

15. The aqueous dispersion adhesive as claimed in claim 1, having a pH range of between 2.5 and 4.

16. The aqueous dispersion adhesive as claimed in claim 1, comprising
a) a copolymer based on one or more polyvinyl esters, the polyvinyl ester additionally containing 0.01%-1.5% by weight, based on the total amount of all monomers, of one or more crosslinkable comonomer units containing N-methylol groups,
b) 1%-20% by weight, based on the total amount of all monomers, of at least one protective colloid,
c) from 0.001% to 1% by weight, based on the amount of the polymer dispersion, of at least one derivative partly or fully etherified with one or more alkanols and from the group of hydroxymethylated cyclic ethyleneureas, hydroxymethylated cyclic propyleneureas, hydroxymethylated bicyclic glyoxal diureas or hydroxymethylated bicyclic malonaldehyde diureas, and d) at least one acidic metal salt, acid, or combination thereof in sufficient amount to establish a pH from 2 to 6.

17. The aqueous dispersion adhesive as claimed in claim 1, which comprises a) a copolymer based on one or more polyvinyl esters, additionally containing 0.01%-1.5% by weight, based on the total amount of all monomers, of one or more comonomer units containing crosslinkable N-methylol groups, and also 0.01%-3.0% by weight, based on the total amount of all monomers, of one or more further functional comonomer units derived from etherified N-methylol monomers, unsaturated carboxylic acids and/or OH-functional esters of unsaturated carboxylic acids, b) 1%-20% by weight, based on the total amount of all monomers, of at least one protective colloid, c) from 0.001% to 1% by weight, based on the amount of the aqueous dispersion adhesive, of at least one derivative partly or fully etherified with one or more alkanols and from the group of hydroxymethylated cyclic ethyleneureas, hydroxymethylated cyclic propyleneureas, hydroxymethylated bicyclic glyoxal diureas or hydroxymethylated bicyclic malonaldehyde diureas, and d) at least one acidic metal salt, acid, or combination thereof, in sufficient amount to establish a pH of 2-6.

18. The aqueous dispersion adhesive as claimed in claim 1, wherein the fraction of the crosslinking agent is from 0.001% to 1% by weight, based on the amount of the aqueous dispersion adhesive.

19. The aqueous dispersion adhesive as claimed in claim 1, further comprising at least one crosslinking catalyst.

* * * * *